United States Patent Office 3,803,179
Patented Apr. 9, 1974

3,803,179
PHENYL-PROPYL-d-ALPHA-TOCOPHEROL-SUCCINATE AND PREPARATION
Gerhard W. Ahrens, 1781 E. 15th St., Brooklyn, N.Y. 11229
No Drawing. Continuation-in-part of abandoned application Ser. No. 862,926, Oct. 1, 1969. This application Mar. 26, 1971, Ser. No. 128,535
Int. Cl. C07d 7/22
U.S. Cl. 260—345.5  2 Claims

ABSTRACT OF THE DISCLOSURE

A new stable, homogeneous and in natural and mineral oils soluble d-alpha-tocopherol-succinate ester is formed by the direct esterification reaction between molecularly equivalent amounts of the mineral-oil-insoluble d-alpha-tocopheryl-acid-succinate and the mineral-oil-insoluble phenylic aromatic alcohol of the formula $$C_6H_5CH_2CH_2CH_2OH$$

wherein the absence of practical water absorption capacities by either of the reactants facilitates the complete removal of the water formed in the reaction without the need for complicated manipulation steps. The ester resulting from the reaction between these two mineral-oil-insoluble reactants, and being soluble in natural and mineral oils, is useful as an additive to non-aqueous topical cosmetic and therapeutic prepartions based on natural as well as on mineral oils, to serve therein, in thereby substituting for less stable tocopherols heretofore used in such preparations which were easily oxidized on exposure to air, as superiorly stable source of vitamin E and a source of antimicrobial activity simultaneously, with said source of vitamin E therein being equivalent to the vitamin E potency of the d-alpha-tocopheryl-acid-succinate originally employed in the formation of the ester, and with said source of antimicrobial activity therein being equivalent to the antimicrobial activity of the phenylic aromatic alcohol of the formula $C_6H_5CH_2CH_2CH_2OH$ originally employed in the formation of the ester which may be employed as is or in its extended form in conjunction with a suitable diluent as is and as additive to aforesaid topical cosmetic and therapeutic prepartions to provide improved stability and longer shelf-lives for the same. Too, the ester or the extended esters as well, may be stored for extended periods of time without damage to its properties and may ever be held in readiness for addition to topical preparations or use as is.

---

This appliction is a continuation-in-part of Ser. No. 862,926, filed Oct. 1, 1969, which was co-pending herewith, but is now abandoned.

The present invention relates to a new kind of d-alpha-tocopherol-succinate ester heretofore not known in the art, and the principal object is to provide such an ester which not only possesses vitamin E potency but coincidental antimicrobial properties as well, and which is excellently suited for use as a topical agent applicable to the skin and as an additive to non-aqueous topical cosmetic and therapeutic preparations including those based on mineral oils in which both vitamin E potencies and antimicrobial properties are desirable features heretofore not being attainable by the addition of only one single agent and requiring separate additions of agents supplying vitamin E potencies and antimicrobial properties. Too, the extremely stable and therefore desirable and upon exposure to air unaffected d-alpha-tocopheryl-acid-succinate could not be employed heretofore as an additive of topical cosmetic and therapeutic preparations having a mineral oil base to serve therein as a source of vitamin E because of its lacking mineral-oil-solubility, so that use had to be made of less stable, upon exposure to air easily oxidized but mineral-oil-soluble tocopherols other than the d-alpha-tocopheryl-acid-succinate, with the result that such preparations lacked the stability obtainable with the use of d-alpha-tocopheryl-acid succinate the use of which has now been made possible by the unexpected novel property possessed by the new ester of d-alpha-tocopherol-succinate of the invention, formed from d-alpha-tocopheryl-acid-succinate and the phenylic aromatic alcohol of the formula $C_6H_5CH_2CH_2CH_2OH$, which is soluble in natural as well as mineral oils, capable of forming therewith homogeneous preparations that possess vitamin E potencies equivalent to those possessed by the tocopherol portion contained in the ester and derived from the d-alpha-tocopheryl-acid-succinate with which the same had been formed, and also possess the antimicrobial properties equivalent to the phenylic aromatic alcohol of the formula $C_6H_5CH_2CH_2CH_2OH$ contained in the said ester which, therefore, constitutes an important advance in the art, by widening the scope for the use of vitamin E as an ingredient of topical cosmetic and therapeutic preparations by not only providing a more stable carrier of vitamin E activity therein than had ever before been available, but by simultaneously also providing antimicrobial properties therein that are often very much desirable, particularly where the preparations to which the ester of the invention is to be added are to be used in the treatment of dermatological skin condition, burns, ulcers and the like.

In forming the new d-alpha-tocopherol-succinate ester of the invention, an esterification reaction is carried out between molecularly equivalent amounts of the free acid intermediate d-alpha-tocopheryl-acid-succinate and the high boiling point liquid phenylic aromatic alcohol of the formula $C_6H_5CH_2CH_2CH_2OH$ having the OH-group on a straight side chain of three $CH_2$-groups attached to a benzene ring. This results in the formation of the desired new ester phenylpropyl-d-alpha-tocopherol-succinate, with the loss of one molecule of water.

As the esterification reaction is carried out in the protective environment simultaneously provided for by the high boiling point phenylic aromatic alcohol, and same reacts with d-alpha-tocopheryl-acid-succinate, preferbly, in an open vessel, it goes therein also to completion coincident with the final removal of the water, that is formed in the reaction, by vaporization and without thereby suffering losses of its own by volatilation such as occur with lower boiling point and water-miscible solvent media; and since esterification reactions between the phenylic aromatic alcohol of the formula $C_6H_5CH_2CH_2CH_2OH$ and d-alpha-tocopheryl-acid-succinate, in addition, do not involve the replacement of methyl groups by ethyl groups, nor the introduction of a double bond in the 3,4 position of alpha-tocopherol and neither a reduction in the size of the long alkyd side chain or the introduction of double bonds in this side chain, also no impairment in the vitamin E potency of the alpha-tocopherol group contained in the newly formed ester of the invention can occur, and the same therefore retains, for all practical purposes, not only the equivalent vitamin E potency possessed by its molecularly equivalent proportion of d-alpha-tocopherol-acid-succinate with which the esterification reaction had been carried out, but also retains the equivalent antimicrobial properties of the referred to phenylic aromtic alcohol constituent of the new phenyl-propyl-d-alpha-tocopherol-succinate ester of the invention.

Employing the free acid intermediate d-alpha-tocopheryl-acid-succinate as the acid reactant for the esterification reaction with the phenylic aromatic alcohol of the formula $C_6H_5CH_2CH_2CH_2OH$ as the alcohol reactant, it came as a surprise that without complicated intermediate manipulation steps such as encountered when, for instance, alkali metal salts or bases are employed to form ester salts with the said free acid intermediate d-alph-tocopheryl-acid-succinate, the phenyl-propyl-d-alpha-tocopherol-succinate ester could be formed directly since the virtual absence of practical water absorption capacities by either of the reactants facilitated the concurrent removal of the water formed by the reaction, while going on to completion, coincident with the final removal of said water, by evaporation, without thereby causing volatilation losses to be incurred by the high boiling point phenylic aromatic alcohol of the formula $C_6H_5CH_2CH_2CH_2OH$ taking part in the esterification reaction with the said free acid intermediate d-alpha-tocopheryl-acid-succinate that causes the formation of the new ester of the invention.

Prior art has it that the free acid intermediate d-alpha-tocopheryl-acid-succinate can be formed by first proceeding through an intermediate step, for instance, by treating a selected tocopherol with a Grignard reagent such as methyl, ethyl or isopropyl magnesium iodide, bromide or chloride to form thereby a halo-magnesium derivative of the tocopherol and then treating the same with succinic anhydride which reacts with the said halo-magnesium derivative of its tocopherol to form an ester salt by inserting itself between the magnesium halide and the oxygen to which it is attached. By acidifying this product, a free acid having one acid group of the starting dibasic succinic acid esterified with the tocopherol is formed in place of the magnesium halide and this free acid intermediate can now be further esterified, for instance, directly, as discovered by the present invention, with the phenylic aromatic alcohol of the formula $C_6H_5CH_2CH_2CH_2OH$, without complicated intermediate manipulation steps heretofore required for, for instance, the further esterification of the said free acid intermediate d-alpha-tocopheryl-acid-succinate with alkali salts or bases to form ester salts therewith in which one acid group has been esterified with tocopherol and the other converted to a salt, for instance, a calcium salt of d-alpha-tocopheryl-acid-succinate obtained by the reaction of d-alpha-tocopheryl-acid-succinate with calcium chloride after first dissolving the d-alpha-tocopheryl-acid-succinate in methanol and concentrated ammonia, followed by addition of a calcium chloride solution in methanol to form a voluminous precipitate, thereafter stirring the mixture for 10 minutes, adding more concentrated ammonia, stirring again and allowing the precipitate to settle, decanting the liquid off and washing the precipitate with acetone; then drying the solid at 100° C. temperature in a vacuum, followed by dissolving the same in hot dioxane and reprecipitating the solid by pouring it into water, followed by decanting again the liquid off, washing the solid again with acetone and drying the same again in a vacuum desiccator; and thereafter again dissolving the solid in hot dioxane, filtering the solution and cooling the resulting filtrate to again recovering a voluminous precipitate to which acetone is then added and mixed thoroughly therewith and then decanted off again and the solid which remained after decanting then again washed with acetone and again dried in a vacuum at 100° C. temperature and therefter again dissolved in hot dioxane and thereafter allowed to crystallize out from the cooled liquid washed again with acetone and then finally again dried at 100° C. temperature under reduced pressure to yield finally the desired calcium salt of d-alph-tocopheryl-acid-succinate.

No such lengthy and rather complicated and therefore expensive manipulation steps, however, were found to be necessary for the formation of the new phenyl-propyl-d-alpha-tocopherol-succinate ester of the invention when carried out by the direct reaction between the free acid intermediate d-alpha-tocopheryl-acid-succinate and the phenylic aromatic alcohol of the formula $C_6H_5CH_2CH_2CH_2OH$ because of the virtual absence of practical water absorption capacities by either of the reactant facilitating concurrent removal of water formed in the said reaction while going to completion coincident with the final removal of that water, whereby the new ester of the invention not only possessed vitamin E potencies that were unimpaired with respect to and equivalent to the amounts originally possessed by the d-alph-tocopheryl-acid-succinate constituent portion of the new ester, but also the inherently possessed antimicrobial properties of the phenylic aromatic alcohol of the formula $C_6H_5CH_2CH_2CH_2OH$ constituent portion of the new ester therefore possessing, without separate addition of an antimicrobial agent, often very much desirable antimicrobial properties simultaneously.

In carrying out the invention by the direct reaction between molecularly equivalent amounts of mineral-oil-soluble d-alpha-tocopheryl-acid-succinate of the formula $C_{33}H_{54}O_5$ and the mineral-oil-insoluble high boiling point phenylic aromatic alcohol of the formula $C_6H_5CH_2CH_2CH_2OH$ which is also identified by the names phenyl-propyl alcohol; phenyl-n-propyl alcohol; 3-phenyl-1-propanol; γ-phenyl-propyl alcohol; and hydrocinnamyl alcohol, along the following step

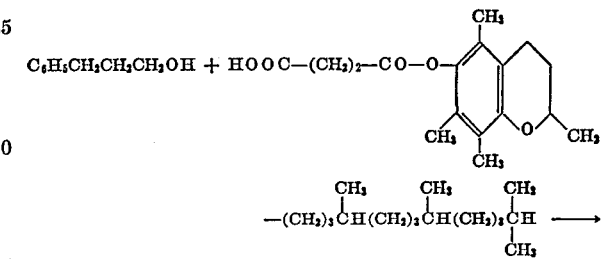

with the loss of one molecule of water, the resulting ester had now acquired new properties not possessed by the reactants before their reaction with one another, including the unobvious and valuable mineral-oil-solubility not possessed by the original reactants. This makes the new ester particularly useful as an additive to topical cosmetic and therapeutic preparations based on mineral oil or petrolatum so widely employed in cosmetic and therapeutic industries. The unobviousness for this newly acquired mineral-oil-solubility of the new ester formed from two mineral-oil-insoluble reactants can also be shown by mixing each reactant or a mixture of both with mineral oil or adding these reactants one after the other to mineral and mixing the solutions, in each instance there will be formed in the mineral oil separate layers of each of the reactants which, upon shaking mix, but on standing separate again into said layers.

The following is a method by which the reaction of the invention is preferably carried out:

Employing 136 grams (one molecular weight) of phenyl-propyl alcohol and 530.79 grams (one molecular weight) of d-alpha-tocopheryl-acid-succinate and placing the mixture of both in an open vessel, preferably of Pyrex glass or glass-lined or otherwise inert material, and heating the vessel, with occasional agitation of its contents, to thereby effect slowly rising temperatures therein, the reaction is started, calling the starting time zero-time when a temperature of 75° C. has been reached and a melt of the contents in the reaction vessel has started forming which, 5 minutes after zero-time, at 80° C., becomes a clear solution. As heating is continued and, 8 minutes after zero-time, the temperature of 95° C. has been reached, the first water vapor begins to leave the reacting mixture, becoming stronger at 100° C., the boiling point of water, 10 minutes after zero-time, and continues to be strong thereafter for about three minutes without change in the temperature despite unchanged heat input. This is followed by a sudden temperature rise to 135° C., within 2 minutes, at 15 minutes after zero-time, under continuing water vapor formation, without change in the heat input when, 25 minutes after zero-time, thus during a period of 10 minutes, the temperature reached 138° C. only and, 30 minutes after zero-time, reached 142° C. The measurable loss of water from the reaction, at this time, was found to be 5.5 grams or about 30% of the water that was expected to be liberated by the reaction after going to completion. Continuing the reaction now, the temperature moved up to 155° C., within 5 minutes, at 35 minutes after zero-time, when the measurable loss of water from the reaction was found to be 13 grams or about 72% of the water expected to be liberated by the reaction after going to completion, and when the temperature reached 158° C., 40 minutes after zero-time, and vapor formation had stopped when the temperature reached momentarily 160° C., 43 minutes after zero-time, and the measurable loss of water from the reaction indicated that the reaction had finally gone to completion and the desired ester had been formed, the reaction was terminated and the clear, homogeneous liquid ester poured into proper receptacles and the receptacles sealed. The yield was 648 grams (97.3%). An attempt to continue heating of the finished ester caused rapid rise in temperature and development of acid colors indicative of decomposing reaction having commenced in the ester, and also indicating that all the water had been removed from the reaction mixture and that the ester had been completed After cooling, the new ester, phenyl-propyl-d-alpha-tocopherol-succinate, of the invention has the tendency to slowly solidify in its receptacle. However, it can easily again be liquefied by moderately heating the same, in the receptacle, on a hot water bath. This ester can be used as is as an additive, for instance, to non-aqueous topical cosmetic and therapeutic preparations to impart both vitamin E potencies thereto as well as antimicrobial properties, and since the new ester of the invention is soluble in both natural as well as mineral oils, including petrolatum, and can be added to preparations containing either of these, although neither, as already pointed out, of the original reactants forming the new ester were mineral-oil-soluble, including petrolatum, it is given the status of being of prime importance and not only useful to the cosmetic and therapeutic industries employing for economic reasons and for reasons of greater stability large amounts of mineral oil, mineral oil base and petrolatum base materials, but also enabling for the first time now the utilization of the most stable source of vitamin E, which is derived from the heretofore mineral-oil-insoluble d-alpha-tocopheryl-acid-succinate, which is stable to air oxidation, as a constituent of topical cosemtic and therapeutic preparations having a mineral oil base, and providing these preparations with a greater stability and longer shelf-life than attainable heretofore with the less stable tocopherols that are subject to oxidation damage upon exposure to air. The new ester of the invention is, in addition, also of prime importance as same not only provides vitamin E but also antimicrobial properties and therefore obviates the need for addition of antimicrobial agents separately to preparations containing the ester of the invention.

When making use of the ester of the invention, which has a vitamin E potency of not less than 960 I.U. per gram material, one way is to add the amount of the ester which corresponds to the desired vitamin E potency for a preparation desired to contain, simply by adding thereto that amount of the ester which is needed to satisfy such desired potency, preferably by melting the ester and dissolving in the said preparation before finishing of the same, in a manner well known in the art of carrying out additions to base preparations, for instance, a preparation is intended to possess a vitamin E potency of 30 I.U. per gram material. This is attained by addition of 3.12 grams of the ester to 96.88 grams of the preparation, followed by in-melting, homogenization and the like to obtain a homogenous preparation which now possesses vitamin E potencies as well as antimicrobial properties. Another way of making use of the ester of the invention is to prepare extended esters before such addition to preparations intended to possess vitamin E potencies and antimicrobial properties as well. The use of extended esters is preferable because of their liquidity which makes the adding procedure easier and no previous liquifying by heating in hot water is necessary for carrying out such additions to preparations intended to contain vitamin E potencies and antimicrobial properties simultaneously. These extended forms of the ester of the invention may also be formed directly and immediately after the ester of the invention is formed, by preferably immediately adding thereto a suitable diluent as which the same phenylic aromatic alcohol of the formula $C_6H_5CH_2CH_2CH_2OH$ such as had been employed in the reaction forming the ester of the invention was found to be most suitable, whereby it was discovered that such a diluent, although by itself not being mineral-oil-soluble, would go immediately in solution and co-solution in the presence of mineral oil as long as the original ester of the invention was present in an amount of at least about 60 percent on the weight of the extended ester thereby formed.

The following Tables 1 and 2 indicate the weight percentage of ingredients present in the original ester as well as in suitable examples of extended esters, all of which may be used for the same purposes and exchangeably at the convenience of the manufacturer of topical cosmetic and therapeutic preparations as well as by physicians for specific dermatological, wound, burns and like treatments of which a few examples will be given.

TABLE 1

| Ingredients used in the reaction | Original ester A | In resulting ester |
|---|---|---|
| Weight percent: | | |
| D-alpha-tocopheryl-acid succinate | 79.6 | |
| D-alpha-tocopherol-succinate | | 79.192 |
| Phenyl-propyl alcohol | 20.4 | 20.808 |
| Vitamin E potency per gram ester, I.U. | 960 | 984 |
| Rideal-Walker antimicrobial coefficient of a 1% emulsion of phenyl-propyl alcohol | 5 | |

TABLE 2

| Ingredients used in making extended esters | Extended esters | | |
|---|---|---|---|
| | #1 | #2 | #3 |
| Parts/weight of original ester A used | 63.127 | 80.41 | 61.88 |
| In A: Esterified phenyl-propyl alcohol content | (13.137) | (16.73) | (12.87) |
| In A: Esterified d-alpha-tocopherol-succinate | (50.00) | (63.68) | (49.01) |
| Phenyl-propyl alcohol as diluent added | 36.863 | 19.59 | 38.12 |
| Vitamin E potency per gram material, I.U., no less than | 605 | 770 | 593 |

The successful use of phenyl-propyl alcohol to form the d-alpha-tocopheryl-acid-succinate ester of the invention, with said phenyl-propyl alcohol having its OH-group on a side chain of three $CH_2$-groups attached to a benzene ring, came also insofar quite unexpected since other phenylic aromatic alcohols of the same group, for instance, benzyl alcohol and phenyl-ethyl alcohol, having however shorter side chain lengths of only one respectively two $CH_2$-groups attached to the benzene ring, failed to form this ester in a similar manner. However, since the differences between these phenylic aromatic alcohols appear to reside in their differences in water absorption capacities, it appears quite feasible that the considerable water absorption capacity of benzyl alcohol and phenyl-ethyl alcohol interfered with the direct formation of the ester because water is not easily given off where the water absorption capacity is high. In support of this view, the water absorption capacities of the three phenylic aromatic alcohols may be compared, showing that, for instance, 0.24 mole water will dissolve in each mole benzyl alcohol and that 0.108 mole water will dissolve in each mole phenyl-ethyl alcohol, respectively absorbed therein, whereas the water absorption capacity of phenyl-propyl alcohol is practically zero or only 0.02 mole for each mole of phenyl-propyl alcohol, generally satisfied already base ingredients may be incorporated in preparations containing the esters of the invention as water is not compatible with the same and may cause instabilities in the preparations.

TABLE 3

[Some tentative examples of preparations containing ester A and extended ester #1]

| Ingredients | H | J | M | O | P | S | G | T |
|---|---|---|---|---|---|---|---|---|
| Percent: | | | | | | | | |
| A Ester | 26.70 | 5.00 | 10.00 | 15.00 | 25.00 | 2.50 | | |
| 1. Ext. ester | | | | | | | 23.70 | 2.00 |
| Almond-base | 73.30 | 95.00 | 90.00 | | | | | |
| Petrolatum | | | | 85.00 | 75.00 | 97.50 | | 98.00 |
| Almond oil | | | | | | | 76.30 | |
| Vit. E/gm./I.U | 256+ | 48+ | 96+ | 144+ | 240+ | 24+ | 143+ | 12+ |
| Physical state | Cream | Cream | Cream | Cream | Cream | Cream | Liquid | Cream |

Note.—Only ingredients related to base are enumerated, other additions and contents of preparations are omitted for clarity, such as filling material, thickeners etc.; Almond base refers to a preparation cited which contains 7.5% glyceryl-mono-stearate; 2.5% glyceryl-mono-palmitate; 0.5% hydrogenated peanut oil and 89.5% sweet almond oil as Vaseline-like paste.

TABLE 4

[Further tentative examples of preparations containing extended esters #1 and #2]

| Ingredients | C | L | D | I | N | R | U |
|---|---|---|---|---|---|---|---|
| Percent: | | | | | | | |
| Ext. ester #1 | 23.70 | 10.00 | | | | | |
| Ext. ester #2 | | | 1.00 | 1.00 | 3.00 | 2.86 | 10.00 |
| Mineral oil | 76.30 | | 99.00 | | | | |
| Almond base | | 90.00 | | 99.00 | 97.00 | | |
| Petrolatum | | | | | | 97.14 | 90.00 |
| Vit. E/gm./I.U | 143+ | 60+ | 7+ | 7+ | 23+ | 22+ | 77+ |
| Physical state | Liquid | Cream | Liquid | Cream | Cream | Cream | Cream | by short exposure to the atmosphere, as same enabled thereby the esterification reaction of the invention to take place between agents lacking practical water-absorption capacities.

Examples of preparations containing the new ester as well as extended esters of the invention are presented in Tables 3–5, whereby it is, however, not being intended to limit the scope of the invention. Too, the scope of vitamin E potencies contained therein shall include raising or lowering the same at will by the addition of more or less of either of the esters or extended esters of the invention, and preparations to which either ester or extended esters of the invention may be added shall include finished bases that already contain substantially all the ingredients known to be part of topical preparations which preferably, however, must exclude such as may be not compatible with the ester or extended ester of the invention added to such preparations, for instance substances apt to interfere with vitamin potencies, stabilities, antimicrobial properties, or, detrimental to cosmetic elegance, homogeneity and smoothness of preparations after being finished by standard finishing methods. Too, sensitizing substances, antimicrobial agents, antioxidants which may act as sensitizers, for instance, benzoic acid and the like, should be best avoided and are, in fact not required in the presence of the antimicrobially active esters of the invention as the stability of creams and preparations is beneficially affected by the same because of their bacterial inhibiting properties which interferes with the development of bacterial degradation and spoilage generally promoted by microorganisms and molds. Substances compatible with the preparations to which the esters of the invention may be added include essential oils, fatty glyceryl-monostearates, glyceryl-mono-palmitates, hydrogenated natural vegetable oils, fruit oils, such as almond oil, petrolatum, mineral oil, and thickener compositions based on natural oils such as, for instance, an almond oil base product of petrolatum-like or Vaseline-like consistency made of 7.5% glyceryl-mono-stearate; 2.5% glyceryl-mono-palmitate and 0.5% hydrogenated peanut oil in 89.5% sweet almond oil, in form of a paste that forms after melting the ingredients together and cooling to room temperature, this base being an excellent substitute for plain Vaseline or petrolatum where a natural oil base is preferred. Other ingredients that may be added are drugs and medical agents that are oil soluble and free of water. No water-

TABLE 5

[Further tentative examples of preparations containing extended ester #3

| Ingredients | E | K | Q |
|---|---|---|---|
| Percent: | | | |
| Ext. ester #3 | 4.00 | 5.00 | 3.20 |
| Mineral oil | 96.00 | | |
| Almond base | | 95.00 | |
| Petrolatum | | | 96.80 |
| Vit. E/gm./I.U | 23+ | 29+ | 19+ |
| Physical state | Liquid | Cream | Cream |

In support of the usefulness of the new ester and of preparations containing same, I will now set forth actual cases of the use of my invention therapeutically: A women, 54 years old, suffered for years on phlebitic ulcerations and developed an open festering ulcer of the size of ½ dollar piece which, despite the efforts of several physicians and hospital care stayed open, oozing pus, and caused great pain. Too, it was severely swollen and the area around it highly inflamed. Antibiotics failed to help, it was considered hopeless. After receiving a supply of ester No. 1 (extended ester), which is liquid, same was tapped on the surface of the ulcer, on July 5, 1969, at noon, and ment was repeated at 8 a.m.; noon; at 4 p.m. and 10 p.m. that evening, the ulcer was closed with a cotton pad soaked in ester No. 1 overnight; in the morning, the treatment was repeated at 8 a.m.; noon; at 4p.m. and 10 p.m. at night, leaving the ulcer uncovered during the day and also for the night. On July 7, there was a considerable reduction in swelling, the pus had disappeared and a scab began to form. The treatment was continued, in the same manner, for 3 more days when all swelling had subsided and the scab appeared healthy. On July 11, the scab came off, leaving a clean surface. It was only when this woman, 6 months later, in January 1970, bruised herself in an area close to the former ulcer on the leg that the ulcer recurred, opened up and caused great discomfort. At that time, no ester No. 1 was available or on hand, so that conventional measures were taken by her physician to help her. However, her ulcer remained open until a new supply of ester No. 1 arrived. Her ulcer, by that time, had greatly enlarged and the renewed use of ester No. 2 was not immediately instituted since her physician wished to try his own method first which, however, failed, so that on Apr. 12, 1970 her ulcer was as bad as ever before and the woman thereafter decided to use again the ester No. 1. This caused, as expected, mainly also on account of the antimicrobial potencies of the ester No. 1, subsidence of the bacterial infection of the ulcer and a slow but progressive healing. Since June 15, 1970, the ulcer has not recurred.

In a second case, a women, 60 years of age, who had been suffering on phlebitic ulcerations, including gangrene for the last 20 years of her life, visited her physician on Mar. 1, 1971 again because of the re-opening of an old ulcer on her left ankle, near the bone, from which pus freely oozed. Her ankle too, was severely swollen, and she had great pain. After examining the nickel-size and ½ inch deep ulcer, the physician recommended merely bed rest and hospitalization for this ulcer which this physician had been treating on and off for years and which really never had closed under this physician's treatment, except in the summer of 1970 when this woman took large quantities by mouth of vitamin E after consulting by mail with the Shute Institue, of London, Ontario, Canada. On Mar. 3, 1971, this woman contacted my home and asked for ester No. 1 about which she had heard through the woman in case 1. She received this ester on Mar. 5, when she, too, reported on a second ulcer of the size of a quarter, about 1½ inches above the ankle ulcer, which had opened on Mar. 3. Both ulcers oozing pus and were greatly swollen and painful. Ulcers 1 and 2 were then treated at her home in the following manner: The ester was tapped onto the surface of both ulcers, each 250 mgs., at a time, with a sterile pad, and covered with that pad. On Mar. 5, at 9:30 a.m., at noon, at 4 p.m. and at 10 p.m., and on Mar. 6, at the same time intervals, the treatments were continued, observing that the ulcers had become clean and the swellings were gradually subsiding, ulcer No. 2 had a closed scab formed, ulcer No. 1 had reduced to half its original size. On Mar. 7 and Mar. 8, under continuing treatments, 4 times a day, using each time now only 100 mgs., both ulcers shrunk in size and all swelling had disappeared, there was no more pain and, on Mar. 9, in the morning, the scab of ulcer No. 2 came off, leaving a clean surface, completely healed, whereas ulcer No. 1 had reduced to ¼ of a dime in size. At the time of this writing, ulcer No. 1 is well on its way to heal. The strong antimicrobial effectiveness of the ester containing 50% of esterified and as extender added phenyl-propyl alcohol, having in 1% emulsion an antimicrobial coefficient of 5 by the Rideal-Walker test, is considered largely responsible for the good results against bacterially contaminated ulcers oozing pus wherein local use can be most effective and the likewise presence of the vitamin E acts to neutralize any possible irritation effects by its counterbalancing antiphlogistic properties, also in conjunction with the effect of vitamin E to beneficially influence the micro-circulatory activity of the skin (Kamimura—Shinyaku to Rinsho, vol. 11, 1961, p. 1021; Yano—Supporo Med. J., vol. 18, 1960, pp. 158 and 236, also vol. 16, 1959, p. 449). Being that this beneficial effectiveness combination in the new ester of the invention is derived from a completely non-toxic one whose constituents are both non-toxic, edible and widely used in medicine and in foods, and can be used without fearing side reactions, and the vitamin E itself having already been employed as a constituent of topical cosmetic and therapeutic preparations for the treatment of, for instance, dermatological skin conditions, burns, ulcers, in wound healing and the like, it is easily recognized that the ester of the invention advances the art to which it appertains, and in further support of the usefulness of this new ester and preparations containing same. I will now set forth a few more actual cases of the use thereof: An elderly man was treated with ester No. 1, each time 200 mgs., applied by a pad soaked therein, to a badly swollen and inflamed ingrown nail from under which pus was oozing out. He was unable to put his shoe on. This nail had been treated since Jan. 9, 1971 by his house physician with a variety of ointments and creams, including a penicillin ointment, without success. On Feb. 12, 1971, treatment was started with ester No. 1, after a thorough washing of the toe, and the area about the toe covered with the pad soaked in the ester. Repeating this treatment for 5 days, all pus was gone on the second day and the swelling started to recede on the third day. The excruciating pain had completely subsided on the fourth day and on the fifth day, the toe was normal in size again, pain free and apparently healed. However, as a precaution, treatment was continued, once a day, by simply wetting the toe with the ester No. 2 for another week, without covering the toe and without bandage since the ester was absorbed by the skin very rapidly.

In another case, a burn from a flame, on a man of middle age, was treated by applying preparation P of Table 3, containing 240 I.U. vitamin E per gram, in an amount to cover the whole burn, in this case about 2 grams, and permitting the preparation to be slowly absorbed before covering the surface. Since this first application caused some stinging, the next application was made with a preparation containing less vitamin E and subsequently less of the antimicrobial agent, namely, with preparation J of Table 3, containing 48 I.U. vitamin E per gram, and continued with this preparation, once a day, for another week, each time using 1000 mgs. of the said preparation, when, on the third day the burn could already be left open after each application since the same was rapidly absorbed by the healing skin. The burn was on the left forearm and about 3 inches in length and 1½ inches in width. In another case of a burn, in size somewhat larger than in the first case, preparation U of Table 4 was employed, containing 77 I.U. vitamin E per gram. In this case, there was no delay in healing and the bandage could be left off already after the fourth day as the preparation U was, too, rapidly absorbed by the healing skin and tissue of the wound. However, absorption was slightly slower than that of preparation J which has a natural oil base, whereas preparation U has a petrolatum base.

In a case of severe skin rash, preparation U was employed because the use of Vaseline or petrolatum is widely suggested and promoted by the medical profession in the treatment of diaper rashes. Too, use of antiseptic preparations in an effort to suppress bacterial urine decompositions has been promoted by the medical profession. However the use of vitamin E as a soothing agent which is so much desirable when rashes plague a child or adult, particularly when same is available in conjunction with such desirable antimicrobial properties as in the ester of the invention and in product containing this ester, represents an entirely new field of applications for the ester of this invention since both properties are now available in one single ester, which in the above case was used in the form of preparation U by application of a layer of the same upon the rashy surface and allowing the same to be absorbed therein, for three days in a row, whereby it was found that this preparation was extremely soothing upon the highly sensitive rashy surfaces and causes a rapid clearing of the same, presumably as the obvious result of the combined vitamin E and antimicrobial actions upon microbial infestations often responsible for the development of rashes. The same good results were obtained in a series of diaper rash cases, using preparation O of Table 3 and preparation M of Table 3 as well as preparation L of Table 4, so that only the presence of the ester of the invention with its double action potency of being antimicrobially active and vitamin E active in preparations to which the ester or extended esters of the same are added, may be credited with the superior results already obtained. However, addition of the ester of the invention to topical cosmetic preparations, too, is not less beneficial to the user of such preparations as same not only possess greater stabilities and their shelf-lives may be prolonged but they will also exert upon the skin to which applied, according to Kamimura (reference cited) the beneficial effects of increasing the micro-circulation therein and thereby the health and beauty of the skin, reducing skin dryness and increasing the metabolism of the skin tissues.

Since now the benefits of the new ester of the invention are clearly apparent, and its use in either pharmaceutical, therapeutical and cosmetic preparations possessing either mineral oil or natural oil bases here documented and indicated where a combined vitamin E and antimicrobial effectiveness in conjunction with long shelf lives, superior stabilities and antiphlogistic soothing effects are desirable features, it is evident that the new ester of the invention represents a truly major advance in the art of topical vitamin E preparations whether they be used for cosmetic or therapeutic purposes, by cosmetically thereby benefitting the microcirculatory system of the skin and therapeutically benefitting the microbial flora of the skin by its antimicrobial activity inherently combined therewith and thereby exerting protection for the skin, and it is also evident that the direct formation of the new ester of the invention by a reaction between two mineral-oil-insoluble reactants such as d-alpha-tocophenyl-acid succinate and phenyl-propyl alcohol, without the complicated manipulation steps known to be required for the formation of ester salts of alkali metal salts or bases with said d-alpha-tocopheryl-acid-succinate, was unobvious and came about unexpected since other phenylic aromatic alcohols belonging to the same group as phenyl-propyl alcohol, except for having shorter side chain lengths attached to the benzene ring and possessing considerable water absorption capacities, were unable to form esters with d-alpha-tocopheryl-acid-succinate in a similar manner.

What I claim is:

1. A method of preparing a stable, homogeneous ester of d-alpha-tocopheryl-acid-succinate with the phenolic aromatic alcohol of the formula $C_6H_5CH_2CH_2CH_2OH$, which comprises reacting with one another, molecularly equivalent amounts of said d-alpha-tocopheryl-acid-succinate and phenolic aromatic alcohol at an elevated temperature, removing the water vapor that forms during the reaction, and recovering the phenyl-propyl-d-alpha-tocopheryl-succinate ester which is thereby produced.

2. A stable, homogeneous ester of d-alpha-tocopheryl-acid-succinate and the phenolic aromatic alcohol of the formula $C_6H_5(CH_2)_3OH$, said ester being soluble in natural and mineral oils and exhibiting the vitamin E potency substantially equivalent to the vitamin E component and the antimicrobial activity of the phenolic component from which said ester is produced.

References Cited
UNITED STATES PATENTS

| | | | |
|---|---|---|---|
| 3,538,119 | 11/1970 | Grant | 260—345.5 |
| 3,657,279 | 4/1972 | Higashi et al. | 260—345.5 |

JOHN M. FORD, Primary Examiner

U.S. Cl. X.R.

424—284

UNITED STATES PATENT OFFICE
CERTIFICATE OF CORRECTION

Patent No. 3,803,179    Dated April 9, 1974

Inventor(s) GERHARD W. AHRENS

It is certified that error appears in the above-identified patent and that said Letters Patent are hereby corrected as shown below:

Column 4, line 15, change "soluble" to --insoluble--;

Column 5, line 24, change "acid colors" to --acrid odors--.

Signed and sealed this 24th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,803,179          Dated April 9, 1974

Inventor(s) GERHARD W. AHRENS

It is certified that error appears in the above-identified patent and that said Letters Patent are hereby corrected as shown below:

Column 3, line 1, change "alph" to --alpha--;

Column 4, line 5, change "alph" to --alpha--;

Column 5, line 51, change "cosemtic" to --cosmetic--;

Column 8, line 52, change "ment" to --treatment--;

Column 11, line 21, change "tocophenyl" to --tocopheryl--.

This certificate supersedes Certificate of Correction issued September 24, 1974.

Signed and sealed this 25th day of March 1975.

(SEAL)
Attest:

RUTH C. MASON
Attesting Officer

C. MARSHALL DANN
Commissioner of Patents
and Trademarks